June 26, 1928.  W. SHAKESPEARE, JR  1,674,744
FISHING REEL
Filed May 8, 1926
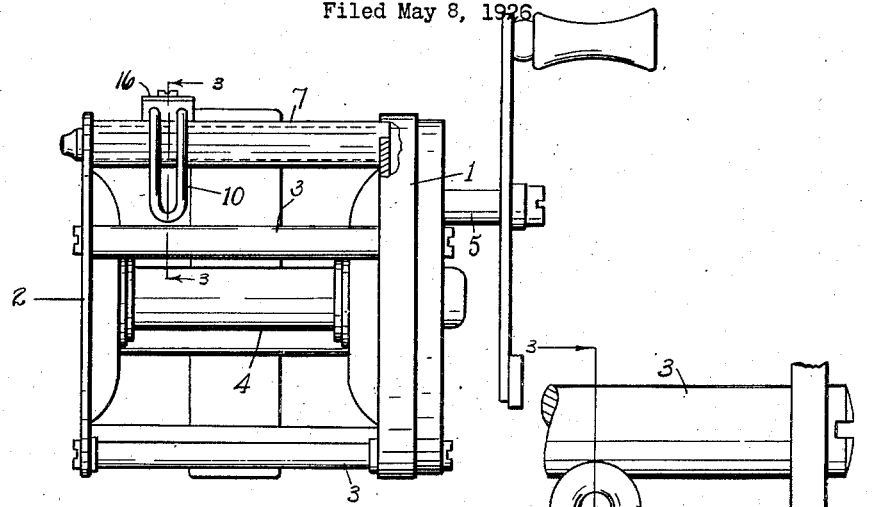
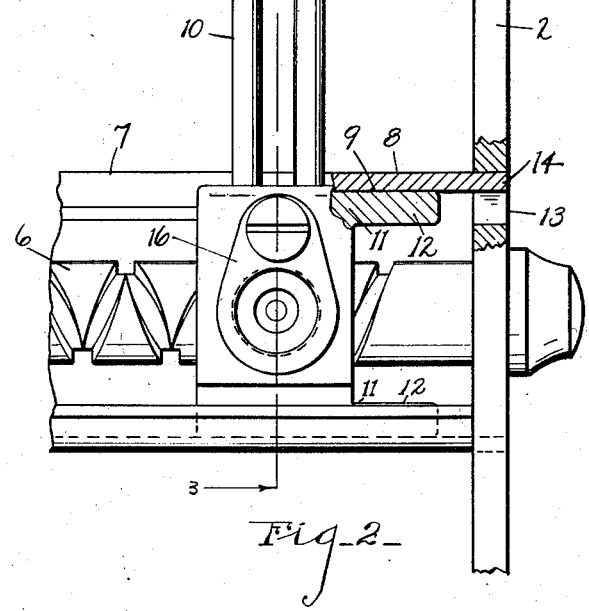
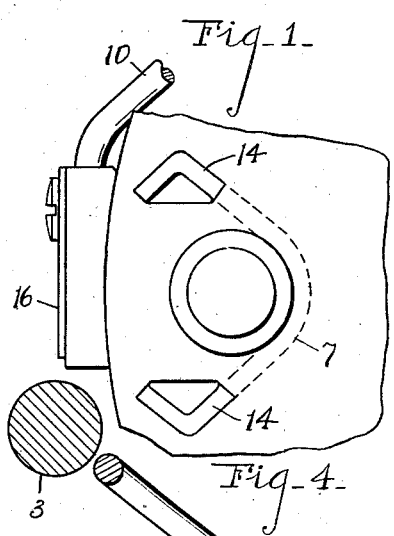
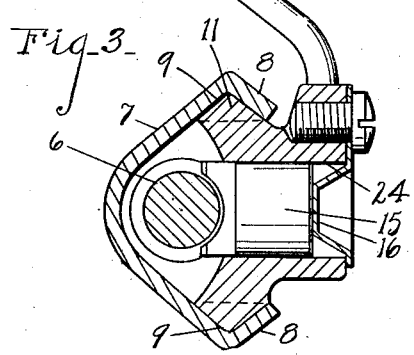
INVENTOR
William Shakespeare Jr.
BY Chappell & Earl
ATTORNEYS Patented June 26, 1928.

1,674,744

UNITED STATES PATENT OFFICE.

WILLIAM SHAKESPEARE, JR., OF KALAMAZOO, MICHIGAN, ASSIGNOR TO SHAKESPEARE COMPANY, OF KALAMAZOO, MICHIGAN.

FISHING REEL.

Application filed May 8, 1926. Serial No. 107,666.

The main objects of this invention are:

First, to provide an improved fishing reel of the level wind type which is very compact and simple in structure and neat and attractive in appearance.

Second, to provide an improved fishing reel of the level wind type in which the line guide carriage is supported for free sliding movement independently of the line traversing shaft, and so that its bearings are not likely to bind in their ways.

Third, to provide a structure having these advantages which is very economical and at the same time durable in use.

Objects relating to details and economies of construction and operation of my invention will definitely appear from the detailed description to follow.

The invention is clearly defined and pointed out in the claims.

A structure which is a preferred embodiment of my invention is illustrated in the accompanying drawing, forming a part of this application, in which:

Fig. 1 is a top view of a fishing reel embodying the features of my invention, parts being broken away to show structural details.

Fig. 2 is an enlarged detail elevation.

Fig. 3 is a detail section on a line corresponding to line 3—3 of Figs. 1 and 2.

Fig. 4 is a fragmentary end view looking from the left of Fig. 1.

In the drawing similar reference characters refer to similar parts throughout the several views.

Referring to the drawing, the frame of the reel in the embodiment illustrated comprises a chambered head member 1 in which the gears are housed, and the plate-like head member 2 or tail plate, as it is sometimes called. These members 1 and 2 are connected by suitable pillars 3.

The reel is provided with a spool 4 driven from the crank 5 and with a reversely threaded traversing shaft 6, also driven from the crank.

The driving gears for the traversing shaft and spool are not illustrated as they form no part of my invention and gear mechanism for the spool and traversing shaft are old in the art.

I provide a line guide carriage way member 7 of channel cross section, this being arranged to embrace the shaft 6 and provided with inturned flange-like portions 8 at its edges coacting with the sides of the way member, forming channel ways 9, in the embodiment illustrated, these ways being of V-shape.

The line guide carriage 10 has V-shaped bearing members 11 coacting with these ways. These bearing members are preferably extended at one end, as at 12, providing bearings of substantial length so that the carriage is less likely to become cramped or wedged in its ways.

The head members of the frame have openings 13 therein, receiving lug-like extensions 14 on the way member so that the way member is properly located and supported without attaching means other than clamping the head members thereon by means of the pillars. The openings 13 in the head member 2 are of such size as to receive the bearing extensions 12.

The carriage 10 is provided with a central bore-like socket 24 for the pawl 15 which is retained in the socket 24, the member 16 constituting a closure for the outer end of the socket.

With this arrangement of parts, the reels may be very economically produced, the carriage is supported in its bearings so that it moves very freely and the traversing shaft is effectively protected.

I have illustrated and described my improvements in one form in which I have embodied the same. I have not attempted to illustrate and describe other embodiments or adaptations as I believe this disclosure will enable those skilled in the art to embody or adapt my improvements as may be desired.

Having thus described my invention, what I claim as new and desire to secure by Letters Patent is:

1. In a fishing reel, the combination of a frame comprising end members and connecting pillars, a traversing shaft, said end members having aligned openings on opposite sides of said traversing shaft, an outwardly facing way member of channel cross section disposed to embrace said traversing shaft and having lug-like extensions at its ends engaging said openings in said frame end members, said way member having inturned flange-like portions at its edges coacting with its sides to provide inwardly facing opposed V-shaped ways, a line guide carriage provided with V-shaped bearing members traveling in said ways and provided with a central bore-like socket aligned with said traversing shaft, a pawl in said socket coacting with said shaft, and a retaining means for said pawl.

2. In a fishing reel, the combination of a frame, a traversing shaft, an outwardly facing way member of channel cross section disposed to embrace said traversing shaft, said way member having inturned flange-like portions at its edges coacting with its sides to provide inwardly facing opposed V-shaped ways, a line guide carriage provided with V-shaped bearing members traveling in said ways and provided with a central bore-like socket aligned with said traversing shaft, a pawl in said socket coacting with said shaft, and a retaining means for said pawl.

3. In a fishing reel, the combination of a frame comprising end members and connecting pillars, a traversing shaft, said end members having aligned openings on opposite sides of said traversing shaft, a channel-shaped way member disposed to embrace said traversing shaft and having lug-like extensions at its ends engaging said openings in said frame end members and said way member having inturned flange-like portions at its edges coacting with its sides to provide inwardly facing opposed channel-like ways, a line guide carriage provided with bearing members traveling in said ways and provided with a pawl socket, a pawl in said socket coacting with said shaft, and a retaining member for said pawl constituting a closure for the outer end of said pawl bore.

4. In a fishing reel, the combination of a frame, a traversing shaft, a channel-shaped way member disposed to embrace said traversing shaft and having inturned flange-like portions at its edges coacting with its sides to provide inwardly facing opposed channel-like ways, a line guide carriage provided with bearing members traveling in said ways and provided with a pawl socket, a pawl in said socket coacting with said shaft, and a retaining member for said pawl constituting a closure for the outer end of said pawl bore.

5. In a fishing reel, the combination of a frame, a traversing shaft, a channel-shaped line guide carriage way member embracing said shaft and provided with opposed inwardly facing V-shaped ways, and a line guide carriage provided with a pawl coacting with said traversing shaft and with V-shaped bearing members coacting with said ways, said carriage being slidably supported in said ways independently of said traversing shaft.

6. In a fishing reel, the combination of a frame, a traversing shaft, a channel-shaped way member embracing said shaft and provided with opposed inwardly facing channel-like ways, and a line guide carriage provided with a pawl coacting with said traversing shaft and with bearing members coacting with said ways, said carriage being slidably supported in said ways independently of said traversing shaft.

7. In a fishing reel, the combination of a frame, a traversing shaft, opposed inwardly facing V-shaped ways, and a line guide carriage provided with a pawl coacting with said traversing shaft and with V-shaped bearing members coacting with said ways, said carriage being slidably supported in said ways independently of said traversing shaft.

8. In a fishing reel, the combination of a frame, a traversing shaft, a channel-shaped way member embracing said shaft and provided with opposed inwardly facing ways, and a line guide carriage provided with a pawl coacting with said traversing shaft and with bearing members coacting with said ways, said carriage being slidably supported in said ways independently of said traversing shaft.

9. In a fishing reel, the combination of a frame, a traversing shaft, a way member embracing said shaft and provided with opposed inwardly facing ways, and a line guide carriage provided with a pawl coacting with said traversing shaft and with bearing members coacting with said ways, said carriage being slidably supported in said ways independently of said traversing shaft.

In witness whereof I have hereunto set my hand.

WILLIAM SHAKESPEARE, Jr.